(12) United States Patent
Zhao et al.

(10) Patent No.: US 12,553,669 B2
(45) Date of Patent: Feb. 17, 2026

(54) EXTERNAL COMBUSTION AIR PREHEAT

(71) Applicant: LUMMUS TECHNOLOGY LLC, Houston, TX (US)

(72) Inventors: Baozhong Zhao, Houston, TX (US); Xueping Li, Houston, TX (US); Alejandro Carrillo, Houston, TX (US)

(73) Assignee: Lummus Technology LLC, Houston, TX (US)

( * ) Notice: Subject to any disclaimer, the term of this patent is extended or adjusted under 35 U.S.C. 154(b) by 449 days.

(21) Appl. No.: 18/188,096

(22) Filed: Mar. 22, 2023

(65) Prior Publication Data

US 2023/0324123 A1    Oct. 12, 2023

Related U.S. Application Data

(60) Provisional application No. 63/269,754, filed on Mar. 22, 2022.

(51) Int. Cl.
*F27D 17/00* (2025.01)
*F27D 17/10* (2025.01)
*F27D 99/00* (2010.01)
*F27D 17/15* (2025.01)

(52) U.S. Cl.
CPC ......... *F27D 17/10* (2025.01); *F27D 99/0006* (2013.01); *F27D 17/15* (2025.01); *F27D 2099/0015* (2013.01)

(58) Field of Classification Search
CPC ............. F27D 17/15; F27D 17/10; F22G 1/02
See application file for complete search history.

(56) References Cited

U.S. PATENT DOCUMENTS

| | | | |
|---|---|---|---|
| 3,623,549 A | 11/1971 | Smith, Jr. | |
| 4,044,820 A | 8/1977 | Nobles | |
| 4,617,109 A | 10/1986 | Wells et al. | |
| 4,721,604 A | 1/1988 | Simonetta et al. | |
| 2010/0174130 A1* | 7/2010 | Spicer | C10G 9/16 422/187 |

(Continued)

FOREIGN PATENT DOCUMENTS

| | | |
|---|---|---|
| CN | 113939578 A | 1/2022 |
| EP | 0030446 A1 | 6/1981 |

(Continued)

OTHER PUBLICATIONS

International Search Report issued in Application No. PCT/US2023/015949, mailed on Aug. 8, 2023 (6 pages).

(Continued)

*Primary Examiner* — Ko-Wei Lin
(74) *Attorney, Agent, or Firm* — Osha Bergman Watanabe & Burton LLP (57) ABSTRACT

Systems and processes for external combustion air preheating for providing preheated combustion air to a furnace. The furnace systems convective heating section includes multiple heating coils for waste heat recovery. The heating coils may be used for preheating a feed (feed preheat coils), heating a boiler feed water, superheating steam, or heating or superheating a feed stream prior to the feed being fed to the radiant coil. The waste heat in the combustion gas is also used to heat a heat transfer fluid, which may be used to pre-heat combustion air or for other purposes within the plant.

20 Claims, 7 Drawing Sheets

(56) References Cited

U.S. PATENT DOCUMENTS

| | | |
|---|---|---|
| 2017/0363288 A1 | 12/2017 | Lee et al. |
| 2019/0023997 A1 | 1/2019 | Sundaram |
| 2020/0024525 A1 | 1/2020 | Dijkmans et al. |
| 2020/0172814 A1* | 6/2020 | Oud .................. C10G 9/18 |

FOREIGN PATENT DOCUMENTS

| | | | |
|---|---|---|---|
| JP | S4859428 | A | 8/1973 |
| JP | S62148591 | A | 7/1987 |
| JP | 2004530537 | A | 10/2004 |
| JP | 2017512278 | A | 5/2017 |
| TW | 200804583 | A | 1/2008 |
| WO | 2021052642 | A1 | 3/2021 |

OTHER PUBLICATIONS

Written Opinion issued in Application No. PCT/US2023/015949, mailed on Aug. 8, 2023 (7 pages).
Garg, A.; "Optimize fired heater operations to save money;" Hydrocarbon Processing; vol. 76; 1997; pp. 97-104 (8 pages).
Office Action issued in corresponding TW Application No. 112110771 dated Jan. 19, 2024 (8 pages).
Office Action issued in United Arab Emirates Application No. P2024-02451, mailed on Aug. 22, 2025 (8 pages).
Office Action issued in corresponding JP Application No. 2024-555391 dated Oct. 7, 2025 (8 pages).

\* cited by examiner

EXTERNAL COMBUSTION AIR PREHEAT

FIELD OF THE DISCLOSURE

Embodiments of the present disclosure generally relate to fired tubular furnaces. More specifically, embodiments herein relate to pyrolysis furnaces for the thermal cracking of hydrocarbons. Even more particularly, embodiments herein relate to an arrangement for efficiently preheating air allowing a reduction in carbon dioxide emissions from fired tubular furnaces.

BACKGROUND

US2020/0172814 (Oud) describes heat recovery systems to increase radiant efficiency and reduce emissions, in which heat is recovered from a cracked gas product to preheat a hydrocarbon feed. Several embodiments are described whereby a preheated oxidant can be obtained by indirect heat exchange between the combustion flue gas and the oxidant. In one embodiment an oxidant preheater downstream in the convection section (i.e., where the flue gas is coldest).

WO2021052642 (Wijnja and Oud) similarly describes a three-step feed preheating scheme, with a combustion air preheater located on the downstream side of the convection section and preferably downstream of all other convection section banks. Heat for the pyrolysis reaction is provided by fuel gas, combustion air and "highly nitrogen depleted oxygen" optionally in the presence of recirculated flue gas. In the limit where all the nitrogen is replaced by recirculated flue gas, the system can be considered oxygen fired combustion with the advantage that the CO2 in the flue gas is very concentrated and suitable for CO2 capture processes as well as eliminating the problem of NOx formation. However, the oxygen provided must be separated from the atmosphere, which introduces a significant capital cost and the energy required for the separation must be accounted for in the operating costs.

Albano et al (1992) describe combustion air preheating using hot exhaust gas from gas turbines (GTs) with reduced oxygen content (15-17 mol % compared to ~21 mol % for air). Co-production of electricity (30-60 MW) is possible, which has a major impact on the plant economy. The use of turbine exhaust gas (TEG) for high level air preheat lowers the heater's fuel requirement. However, unlike air preheat systems, because of the reduced oxygen content of TEG, the total mass flow of flue gas passing through the furnaces is increased. This results in increased steam production in the convection (heat recovery) section of the pyrolysis module.

U.S. Pat. No. 4,617,109 (Wells and Petterson) describes an air preheating scheme whereby combustion air is preheated by indirect heat exchange with steam that has been expanded through steam turbines from high pressure steam generated in the hottest section of the furnace. As in the previous examples the radiant efficiency is increased, however, the combustion air does not exchange heat directly with flue gas in the convection section.

U.S. Pat. No. 4,044,820 (Nobles) teaches the use of a heat transfer fluid to recover heat from a flue gas to a combustion air stream via a continuously flowing heat transfer fluid having high heat capacity (product of mass flow and specific heat capacity). The proposed method involves a two-chamber system whereby the first chamber (for cooling flue gas) is separated from the second chamber (for heating air) by a common wall. The high circulation rate of the heat transfer fluid ensures that the temperature of the heat transfer surfaces remains above the acid dew point of the flue gas, thereby preventing condensation and associated corrosion risk.

U.S. Pat. No. 3,623,549 (Smith) presents a liquid to gas heat exchange apparatus with the function of transferring heat from a relatively hot gas in one location, to a relatively cool gas in a separate location. Multiple heat transfer fluids with different phase change properties are used to cover a wider temperature range than would be possible by using a single heat transfer fluid such as water. Such a system is presented as an alternative to a recuperative heat exchanger, where the hot gas is separated from the cold gas by a heat transfer surface, or a regenerative heat exchanger, where the hot gas and cool gas are periodically circulated through a thermal mass.

US20170363288 (Lee and Sadler) describes a fired heater system with a heat pipe preheater. A heat pipe is a sealed tube containing a working fluid which transfers heat from a hot source to a colder sink. The heat pipe is used to transfer heat from the hot flue gas to the combustion air without the need to introduce the combustion air into the stack. Instead, a separate air preheater duct is attached to the stack and the heat pipes penetrate the stack wall. Whilst this arrangement avoids the need to incorporate an air preheater in the convection section of a furnace, it does not address the structural cost associated with mounting the device on the stack. The working fluid should be carefully selected as it must simultaneously satisfy several constraints such as viscous, sonic, capillary, entrainment, and nucleate boiling levels for the heat pipe system to work correctly. The system does not allow flexibility in the location of the air preheater, other than that it is outside on the stack.

In many industrial applications, heat transfer fluid (HTF) is used to supply required amount of heat to multiple heat demands from a single heat source. For instance, it is known to use a biomass heat source to provide an elevated temperature hot utility using a heat transfer fluid as an alternative to steam generation. Appropriate integration of fired heater with a process leads to overall reduction in energy requirement as well as capital investment. However, in large, specialized furnaces such as steam cracking furnaces to produce bulk chemicals such as ethylene, propylene, butylene, and aromatics, non-process heat recovery is via the production of steam, which is in turn used to drive compressors and other processes in the downstream separation section. In effect the energy for downstream processing is therefore derived from burning fuels in the steam cracking furnace.

SUMMARY

In one aspect, embodiments herein are directed toward a furnace system for cracking hydrocarbons. The furnace system includes a furnace having a radiant heating section and a convective heating section, wherein the radiant heating section includes one or more burners configured for combusting a fuel with a pre-heated air stream to produce a flue gas fed to the convective heating section. A heat transfer fluid heating coil is disposed within the convective heating section of the furnace. The furnace system also includes a feed preheat coil configured for receiving and pre-heating a hydrocarbon feed to produce a pre-heated hydrocarbon feed. A radiant process coil is disposed within the radiant heating section, configured for receiving the pre-heated hydrocarbon feed and producing a cracked hydrocarbon product. The furnace system further includes an air preheater having an air inlet, a preheated air outlet, a heat transfer fluid inlet, a heat transfer fluid outlet, and one or more heat exchange surfaces for indirectly heating air received via the air inlet by indirect heat exchange with a hot heat transfer fluid received via the heat transfer fluid inlet to produce the pre-heated air stream, recovered via the preheated air outlet, and a cooled heat transfer fluid, recovered via the heat transfer fluid outlet. One or more flow lines fluidly connect the preheated air outlet with the one or more burners, for supplying the pre-heated air stream to the one or more burners. A heat transfer fluid circulation system is also included, having a flow line for circulating the cooled heat transfer fluid from the heat transfer fluid outlet to an inlet of the heat transfer fluid heating coil disposed within the convective heating section of the furnace, and a flow line for circulating the hot heat transfer fluid from an outlet of the heat transfer fluid heating coil to the heat transfer fluid inlet.

In some embodiments, the furnace system includes a selective catalytic reduction catalyst bed disposed within the convective heating section of the furnace. In some of such embodiments, the heat transfer fluid heating coil may have an upper heat transfer fluid heating coil and a lower heat transfer fluid heating coil, wherein the selective catalytic reduction catalyst bed is disposed within the convective heating section of the furnace above a location of the lower heat transfer fluid heating coil and below a location of the upper heat transfer fluid heating coil.

In another aspect, embodiments herein are directed toward a method of cracking hydrocarbons using the system as described above. The method includes: heating a heat transfer fluid in the heat transfer fluid heating coil to produce the hot heat transfer fluid; heating air via indirect heat exchange with the hot heat transfer fluid in the air preheater to produce a pre-heated air; and mixing the pre-heated air with a fuel to form a combustion mixture and combusting the combustion mixture in the one or more burners.

In some embodiments, such as those including a selective catalytic reduction catalyst bed, the method may include controlling a temperature of the flue gas entering the selective catalytic reduction catalyst bed.

In a further aspect, embodiments herein are directed toward a method of retrofitting a cracking furnace having a steam superheating coil, a boiler feedwater heating coil, and a feed preheat coil, each coil comprising multiple tubes connected to a feed header and an effluent header. The retrofit method includes: disconnecting one or more tubes of the boiler feedwater heating coil from a boiler feedwater circulation system; fluidly connecting the one or more tubes to a heat transfer fluid circulation system; and fluidly connecting an air preheater to the heat transfer fluid circulation system and to burners of the cracking furnace.

In yet another aspect, embodiments herein are directed toward a heater system. The heater system includes: a furnace having a radiant heating section and a convective heating section, wherein the radiant heating section includes one or more burners configured for combusting a fuel with a pre-heated air stream. A heat transfer fluid heating coil is disposed within the convective heating section of the furnace. The heater system includes an air preheater having an air inlet, a preheated air outlet, a heat transfer fluid inlet, a heat transfer fluid outlet, and one or more heat exchange surfaces for indirectly heating air received via the air inlet, via indirect heat exchange with a hot heat transfer fluid received via the heat transfer fluid inlet, to produce the pre-heated air stream, recovered via the preheated air outlet, and a cooled heat transfer fluid, recovered via the heat transfer fluid outlet. One or more flow lines fluidly connect the preheated air outlet with the one or more burners, for supplying the pre-heated air stream to the one or more burners. The heater system further includes a heat transfer fluid circulation system including a flow line for circulating the cooled heat transfer fluid from the heat transfer fluid outlet to an inlet of the heat transfer fluid heating coil disposed within the convective heating section of the furnace, and a flow line for circulating the hot heat transfer fluid from an outlet of the heat transfer fluid heating coil to the heat transfer fluid inlet. In various embodiments, the heat transfer fluid heating coil is configured as multiple heating coil sections separated by one or more additional heat recovery coils configured for heating one or more of a hydrocarbon feed, water, steam, or mixtures thereof.

DETAILED DESCRIPTION

The prior practice, as described above, often involves expensive modifications to the convection section directed at raising the firebox radiant efficiency and thereby reducing the fuel consumption by increasing the quantity of heat used for process heating (of a feed gas or an oxidant) at the expense of heat used for non-process heating (such as generating steam).

The exchange of heat between flue gas and oxidant, such as in the case of Oud or Oud and Wijnja, occurs downstream of the convection section (i.e., heat is exchanged with the coldest flue gas).

Heating air by indirect heat exchange with expanded steam may be external to the convection section but does not address the fact that fuel must be consumed (with associated emissions) in order to generate the steam in the first place.

Use of a heat pipe heat exchanger, multiple flow loops or two chamber systems to recover heat from flue gas without introducing air into the convection section have been practiced, but these methods require significant amounts of structural alterations (in the case of a retrofit) or expensive convection section designs to be attached to the heater convection section.

In many industrial applications, heat transfer fluid (HTF) is used to supply a required amount of heat to multiple heat demands from a single heat source. For instance, it is known to use a biomass heat source to provide an elevated temperature hot utility using a heat transfer fluid as an alternative to steam generation. Appropriate integration of a fired heater with a process leads to overall reduction in energy requirement as well as capital investment. This is particularly relevant to the global ethylene industry since there is an exceptionally large installed base. It would be impractical, or extremely expensive, to apply the prior art methods to this large installed base due to structure steel and foundation loading limitations. A simple inexpensive method to reduce $CO_2$ emissions is required that can be quickly applied to the installed base of ethylene steam cracking furnaces.

However, in large, specialized furnaces, such as steam cracking furnaces to produce bulk chemicals such as ethylene, propylene, butylene, and aromatics, non-process heat recovery is via the production of steam, which is in turn used to drive compressors and other processes in the downstream separation section. In effect, the energy for downstream processing is therefore derived from burning fuels in the steam cracking furnace.

Embodiments herein relate to alternative heat recovery methods, which do not require that the chemical energy of the fuel be converted to heat and work energy via generation of steam (with associated emissions) and can significantly reduce the fuel consumption of an existing furnace by at least 5% and as much as 30%. Such embodiments as described herein are also inexpensive and do not require significant additional structural changes to a convection section. Further, the heat recovery of embodiments herein maintains a desirable thermal profile in the convection section, with high efficiency and allow for flexibility in feed preheating. Lastly, such a heat recovery method can be applied to an existing furnace without significant modifications to the heating surface, structures and foundation loading. Embodiments herein meet one or more of these objectives, and in some embodiments, all of these objectives.

Embodiments herein are directed toward furnace systems used for processing of hydrocarbons. More specifically, embodiments herein are directed toward furnace systems and arrangements of heat recovery coils within the convection section of such furnaces.

Furnace systems according to embodiments herein have a radiant section and a convective heating section. The radiant section, also referred to as a radiant zone or fired heater box, includes one or more burners, such as floor and/or wall burners for combusting a fuel, producing radiant heat and a combustion gas. The combustion gas passes from the radiant section to the convective heating section prior to being expelled as a flue gas to the atmosphere. One or more radiant process coils are disposed within the radiant section, the process coils being heated by the radiant heat from the burners, resulting in the heating and/or conversion of the fluids being processed.

The convective heating section includes multiple heating coils for waste heat recovery. The heating coils may be used for preheating a feed (feed preheat coils), heating a boiler feed water, superheating steam, or heating or superheating a feed stream prior to the feed being fed to the radiant coil. The waste heat in the combustion gas is also used to heat a heat transfer fluid, which may be used to pre-heat combustion air or for other purposes within the plant.

Embodiments herein allow the heat extraction from the combustion flue gas into the heat exchange medium (heat transfer fluid) to be at any section of the heater, as needed. Some embodiments extract heat from multiple sections. In contrast, in the prior art, the heat extraction for air pre-heat is typically limited to the coldest part of the convection section. When the heat is extracted into a heat transfer fluid from multiple sections according to embodiments herein, the sections can be in series or in parallel or a combination of series and parallel.

Heat extraction may be performed according to embodiments herein using a heat transfer fluid. The heat transfer fluid can be one or different types of fluid to aim at different service temperatures. The heat extracted from the heater using the heat transfer fluid can then be used to warm up the combustion oxidant or other process fluid(s).

Embodiments herein may use the heat extraction with the heat transfer fluid to also regulate the flue gas temperature profile in the convection section. The ability to regulate the flue gas temperature profile may improve the heater process performance and emission reduction, such as by controlling a flue gas temperature at a selective catalytic reduction (SCR) catalyst bed for optimum NOx reduction.

The heat extracted from the selected heater, such as to heat combustion air or other fluids, can be indirectly applied back to the same heater or to other heat transfer equipment. Further, embodiments herein may provide options to dilute the preheated oxidant with flue gas (e.g., external flue gas recirculation to the burners to lower the NOx).

Figure 1:
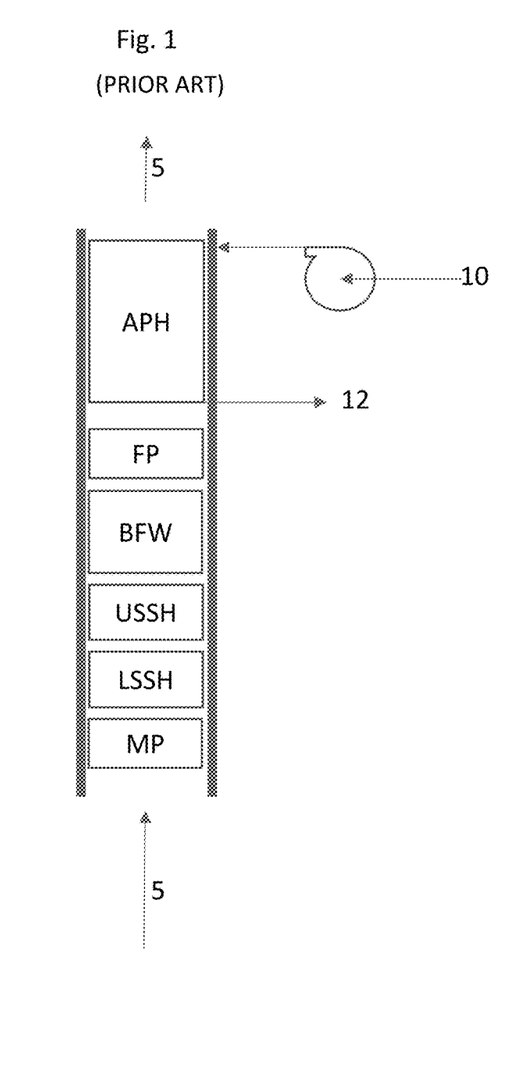
FIGS. 1 and 1A illustrate prior art combustion air preheat methods.
Figure 1A:
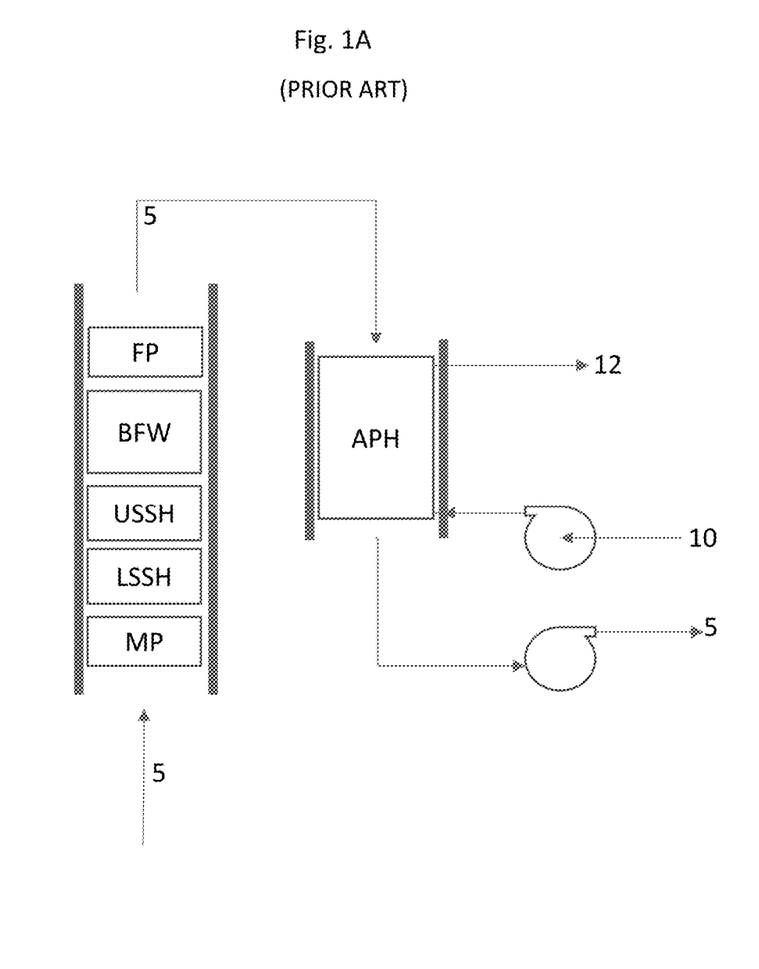

Prior art combustion air preheat methods are shown in FIGS. 1 and 1A. For simplicity, flow lines as described are not illustrated. A hydrocarbon feed is preheated in feed preheat coil FP in the convection section, mixed with dilution steam, and optionally further preheated in an external heat exchanger (STLE, not shown) against a quenched cracked gas product. The hydrocarbon plus dilution steam mixture is yet further preheated in mixed preheat coil MP against the hot combustion gas in the convection section and fed to the radiant box, where the energy required to thermally crack the hydrocarbons to produce a cracked gas product is supplied by burning a fuel in an oxidant stream to produce a hot flue gas 5. In-between the two feed preheat sections FP, MP of the convection section, steam is generated by successively heating boiler feed water in boiler feed water coil BFW, feeding the heated boiler feedwater to a steam drum (not shown) generating steam by quenching the hot cracked gas leaving the radiant section and further heating the high-pressure steam in the convection section to produce superheated steam in upper steam superheat section USSH and lower steam superheat section LSSH. In the coldest section of the convection section, an air preheater (APH) is introduced which indirectly transfers heat from the flue gas to the combustion air 10 prior to mixing the resulting hot air 12 with fuel in the burners. The APH addition, whether within the same convection section as illustrated in FIG. 1 or within a separate heat recovery zone as illustrated in FIG. 1A, enables an increase in radiant efficiency whilst keeping overall thermal efficiency high.

The radiant efficiency is the quantity of heat transferred in the radiant section divided by the total energy provided. The heat absorbed by the radiant coils plus heat losses of the radiant section is equal to the heat given up by the flue gas at adiabatic flame temperature to the temperature at which it leaves the radiant section. Radiative efficiency is affected by radiation heat transfer to the convection section, which in turn depends on burner location since burners located higher in the firebox will radiate more heat towards the convection section that is not transferred to the reaction in the firebox.

There are a few variations of such prior art convective heat transfer schemes, but in general the energy of the hot flue gas is used to preheat boiler feed water, generate steam, and superheat steam in addition to preheating the hydrocarbon feed and hydrocarbon feed plus dilution steam. Energy is saved in the convection section by preheating the hydrocarbon feed and dilution steam; by using utility preheating, i.e., boiler feed water preheating, dilution-steam superheating, high-pressure steam superheating or by preheating the combustion air. Some convection sections may also include integrated catalyst systems for NOx removal by selective catalytic reduction (SCR) technology, whereby the NOx present in the flue gas reacts with ammonia.

Figure 2:
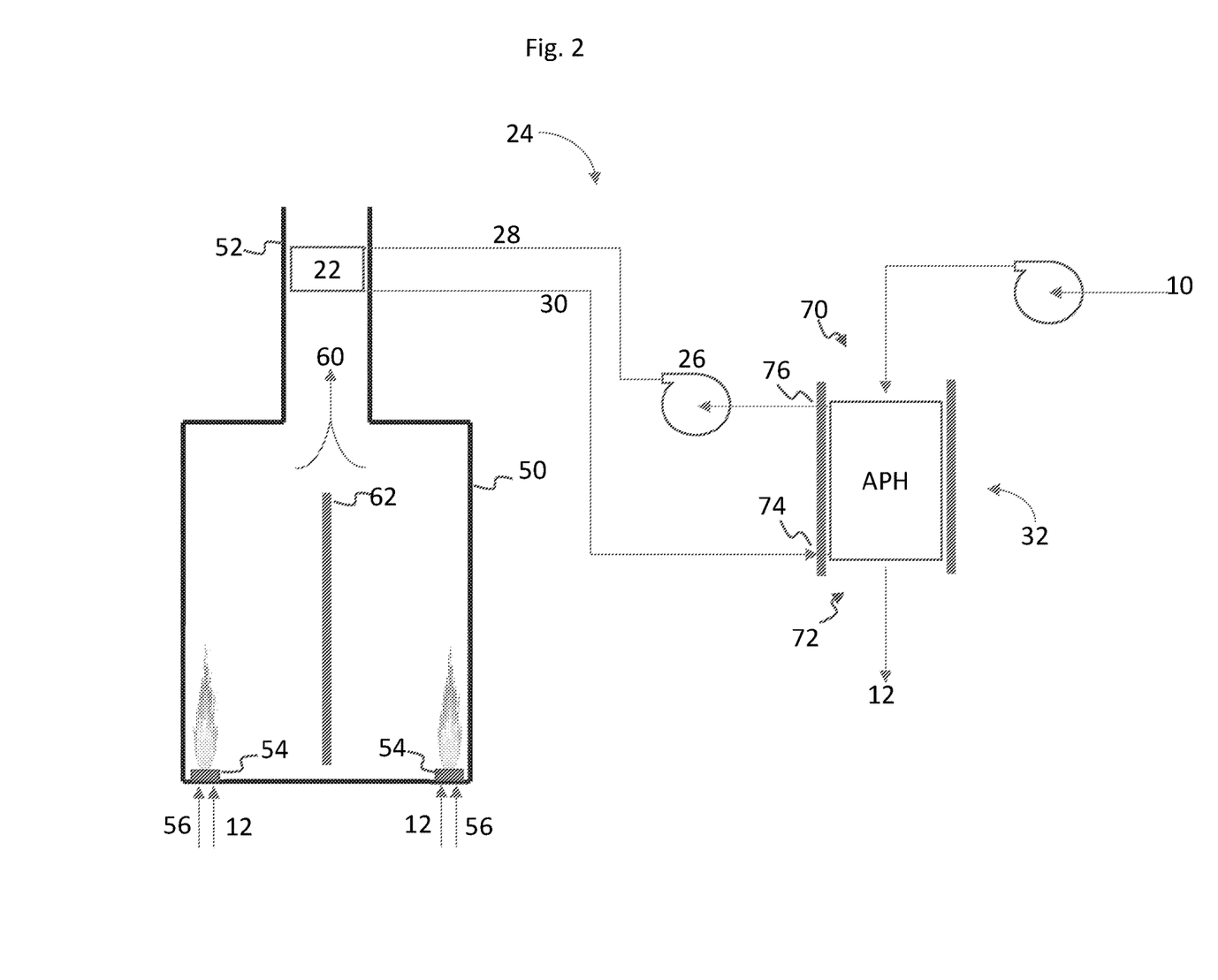
FIG. 2 and FIGS. 2A-2E illustrate systems for heat recovery and air preheat according to embodiments herein utilizing an intermediate heat transfer fluid heat recovery.

Embodiments herein relate to furnace systems, such as those used for cracking hydrocarbons. Such furnaces, as illustrated in FIG. 2, include a radiant heating section 50 and a convective heating section 52, wherein the radiant heating section includes one or more burners 54 configured for combusting a fuel 56 with a pre-heated air stream 12 to produce a flue gas 60 fed to the convective heating section. A radiant process coil 62 is disposed within the radiant heating section, receiving a pre-heated process fluid, such as a hydrocarbon, for further heating and cracking of the hydrocarbon.

Embodiments herein are further directed toward the arrangement of heating coils (illustrated in FIGS. 2A-2E and described further below) disposed within the convective heating section. Embodiments herein include: a heat transfer fluid heating coil 22 disposed within the convective heating section 52 of the furnace; one or more steam heating coils (see FIGS. 2A-2E); and one or more hydrocarbon feed preheat coils (see FIGS. 2A-2E) configured for receiving and pre-heating a hydrocarbon feed to produce a pre-heated hydrocarbon feed. The radiant process coil 62 disposed within the radiant heating section is configured for receiving the pre-heated hydrocarbon feed and producing a cracked hydrocarbon product.

An air preheater 32 having an air inlet 70, a preheated air outlet 72, a heat transfer fluid inlet 74, a heat transfer fluid outlet 76, and one or more heat exchange surfaces (not illustrated) is configured for indirectly heating air 10 received via the air inlet 70 by indirect heat exchange with a hot heat transfer fluid received via the heat transfer fluid inlet 74 to produce the pre-heated air stream 12. The preheated air stream 12 is recovered via the preheated air outlet 72, and a cooled heat transfer fluid is recovered via the heat transfer fluid outlet 76. One or more flow lines (not illustrated) fluidly connect the preheated air outlet with the one or more burners, for supplying the pre-heated air stream 12 to the one or more burners. Further, a heat transfer fluid circulation system 24 includes a flow line 28 for circulating the cooled heat transfer fluid from the heat transfer fluid outlet 76 to an inlet of the heat transfer fluid heating coil 22 disposed within the convective heating section 52 of the furnace, and a flow line 30 for circulating the hot heat transfer fluid from an outlet of the heat transfer fluid heating coil to the heat transfer fluid inlet 74. A pump 26 may be used to convey the heat transfer fluid within the heat transfer fluid circulation system 24.

FIGS. 2A-E show systems for preheating combustion air with intermediate heat transfer fluid heat recovery according to embodiments herein. Common features of these embodiments include: (i) a circulating heat transfer fluid, (ii) a heat recovery section or sections 22 (heat transfer fluid heating coil(s)) inside the convection section, (iii) a heat transfer fluid circulation loop 24 for circulating the heat transfer fluid, and (iv) an air preheater APH.

Heat transfer fluids for use at elevated temperatures up to 400° C. can be categorized as synthetics, hot oils, and inorganics, including silicones. A suitable synthetic heat transfer fluid in processes that require elevated temperatures in the liquid state is usually a eutectic mixture of biphenyl and diphenyl oxide, commonly called biphenyl or HTF (Heat Transfer Fluid). This fluid can be found on the market, for example, under the brand names DOWTHERM-A and THERMINOL VP-1. Such fluids can be used up to 400° C. Other heat transfer fluids can be selected based on their properties and stability under the operating conditions. Silicone based heat transfer fluids offered under brand names such as SYLTHERM 800 are also suitable.

For systems utilizing high-temperature process waste heat, the HTF heater represents the highest local fluid film temperature as well as the maximum fluid bulk temperature. The HTF velocity over the heat transfer surface should be maximized as this will result in lower skin temperatures. Dead flow zones which result in high residence times should be avoided. For this reason, configurations with HTF contained within tubes is preferred, with a heat transfer fluid velocity in the range 2-3 m/s or higher.

Heat transfer fluid circulation loops according to embodiments herein include piping from an expansion tank (not shown) to a pump 26, piping 28 from a pump to one or more heat transfer fluid heating coils 22, and piping 30 from the heat transfer fluid heating coils to an external heat exchanger 32. In FIGS. 2A-E the external heat exchanger is an air preheater used to preheat an oxidant mixture (such as air) used for combustion of fuel in the radiant firebox. The heat transfer loop may be non-pressurized so long as the operating temperature is below the normal boiling point of the heat transfer fluid. Pressurized liquid-phase systems whereby an inert gas (usually $N_2$) is applied through the expansion tank may be required if the heat transfer fluid operating temperature is above its normal boiling range to maintain the heat transfer fluid as a liquid.

Pressurized vapor-phase systems for synthetic diphenyl oxide/biphenyl-type fluids are also possible. A vapor-phase system can be designed using a pump or hydrostatic pressure to gravity return the condensate from the heat sink (air preheater) to the vaporizer (convection section coil). More complex systems require a flash tank, condensate return tank and a condensate return pump. The added capital equipment costs and complexity of vapor-phase systems are offset by the increased heat delivery per unit mass of heat transfer fluid.

The air preheater can be a single heat exchanger per heater, or multiple heat exchangers per heater or a single preheater for multiple heaters, the variations depending on the size and capacity of a single unit. The air preheater may be a plat type or tubular type of heat exchanger, and may include extended heating surfaces such as studs or fins, for example. Since the heat transfer coefficient of the lower pressure air is quite low in comparison to the heat transfer fluid, an appropriate design would be for the heat transfer fluid to flow inside tubes with the air flowing outside the tubes. An extended surface in the form of heat transfer fins can be provided on the outside of the tubes to increase the heat transfer surface area and to compensate for the much lower heat transfer coefficient on the air side. The tubes may be round or elliptical steel tubes. The fins may be applied to the tube in the form of spiral fins or helical fins which are wound continuously around each individual tube, and may be edge wound, bonded to the tube by tension, L-footed or embedded into a groove on the tube surface. Alternatively, many tubes can be incorporated into a plate-fin structure by inserting tubes into a plate fin pack and mechanically expanding the tubes into the plate pack. In either of the above designs the air will be in crossflow relative to the heat transfer fluid, and the heat transfer tube side may have multiple passes.

In addition to the heat transfer fluid heating coils 22, one or more additional heating coils may be disposed within the convective heating section and arranged as illustrated in FIGS. 2A-2E. Such additional heating coils may include steam superheating coils (SSH). Other heating coils may include feed preheat coils (FP) used for heating a hydrocarbon feed, mixed feed preheat coils (MP) used for mixing hydrocarbon and steam mixtures, as well as boiler feed water (BFW) heating coils. The relative position of a particular type of coil within the convective section is denoted by upper (U), middle (M), or lower (L), USSH being the upper steam superheating coil, for example.

Various embodiments herein include a feed preheat coil (FP) disposed within the convective heating section of the furnace above a location of the heat transfer fluid heating coil 22. As would be recognized by one skilled in the art, the temperature of the flue gas at a particular coil location decreases with distance from the radiant heating section flue gas outlet, due in part to the heat extraction via the multiple heating coils. The above may thus be restated as the feed preheat coil is at a lower flue gas temperature than for the heat transfer fluid heating coil.

Further, embodiments herein include a boiler feed water heating coil and one or more steam superheating coils disposed within the convective heating section of the furnace. The heat transfer fluid heating coil may be disposed below a location of the boiler feed water heating coil and above a location of the steam superheating coils.

Some embodiments herein may also include a selective catalytic reduction catalyst bed disposed within the convective heating section of the furnace. Some embodiments may also include multiple heat transfer fluid heating coils, such as an upper heat transfer fluid heating coil and a lower heat transfer fluid heating coil. In some arrangements, the heat transfer fluid heating coil includes an upper heat transfer fluid heating coil and a lower heat transfer fluid heating coil, wherein a selective catalytic reduction catalyst bed is disposed within the convective section of the furnace above a location of the lower heat transfer fluid heating coil and below a location of the upper heat transfer fluid heating coil.

In yet other embodiments, an external feed and/or mixed feed preheat section may be provided external to the convective heat transfer section.

The various configurations as outlined above are illustrated and described specifically with respect to FIGS. 2A-2E below.

Figure 2A:
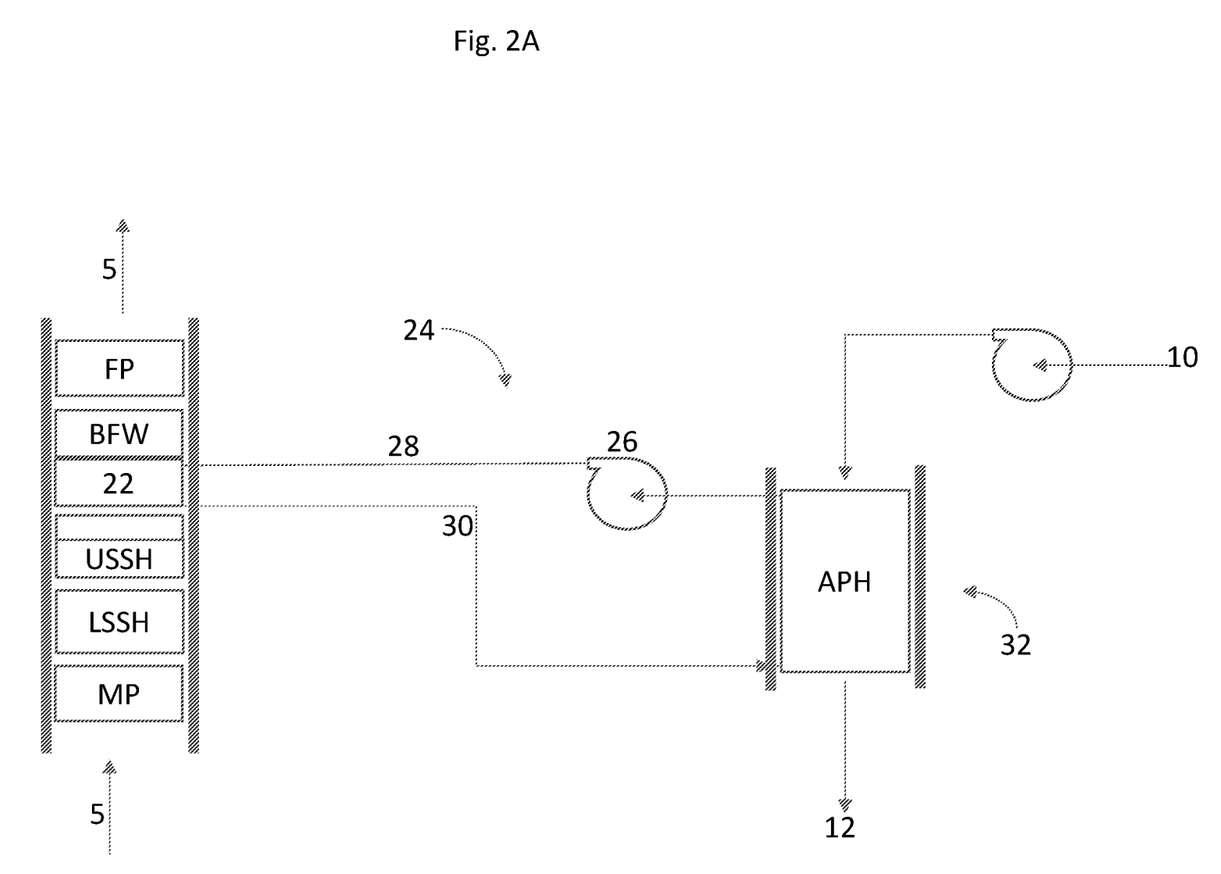

FIG. 2A illustrates one embodiment for recovering heat from a flue gas according to embodiments herein. The coils included within the convective heating section of the furnace are arranged in the following order from lowest (highest flue gas temperature, closest to the combustion box) to highest (lowest flue gas temperature, furthest from the outlet of the combustion box): a mixed preheat coil (MP); a lower steam superheating coil (LSSH); an upper steam superheating coil (USSH), a heat transfer fluid heating coil 22, a boiler feed water heating coil (BFW), and a feed preheat coil (FP). As described above, heat transfer fluid heating coil 22 receives cool heat transfer fluid from circulation pump 26, heats the heat transfer fluid, and the heated heat transfer fluid circulates via flow line 30 to the air preheat coils APH, which may include one or more finned tubes or other heat transfer surfaces as described above.

For embodiments retrofitting a heat recovery system such as that illustrated in FIG. 1, to arrive at the heat recovery system as illustrated in FIG. 2A the heat recovery system is modified such that a portion of the tubes previously used to preheat BFW are re-purposed to instead heat a heat transfer fluid. In some embodiments, the upper steam superheat coil is also modified to account for the smaller amount of steam generated. Reducing steam generation is an objective of some embodiments herein.

Figure 2B:
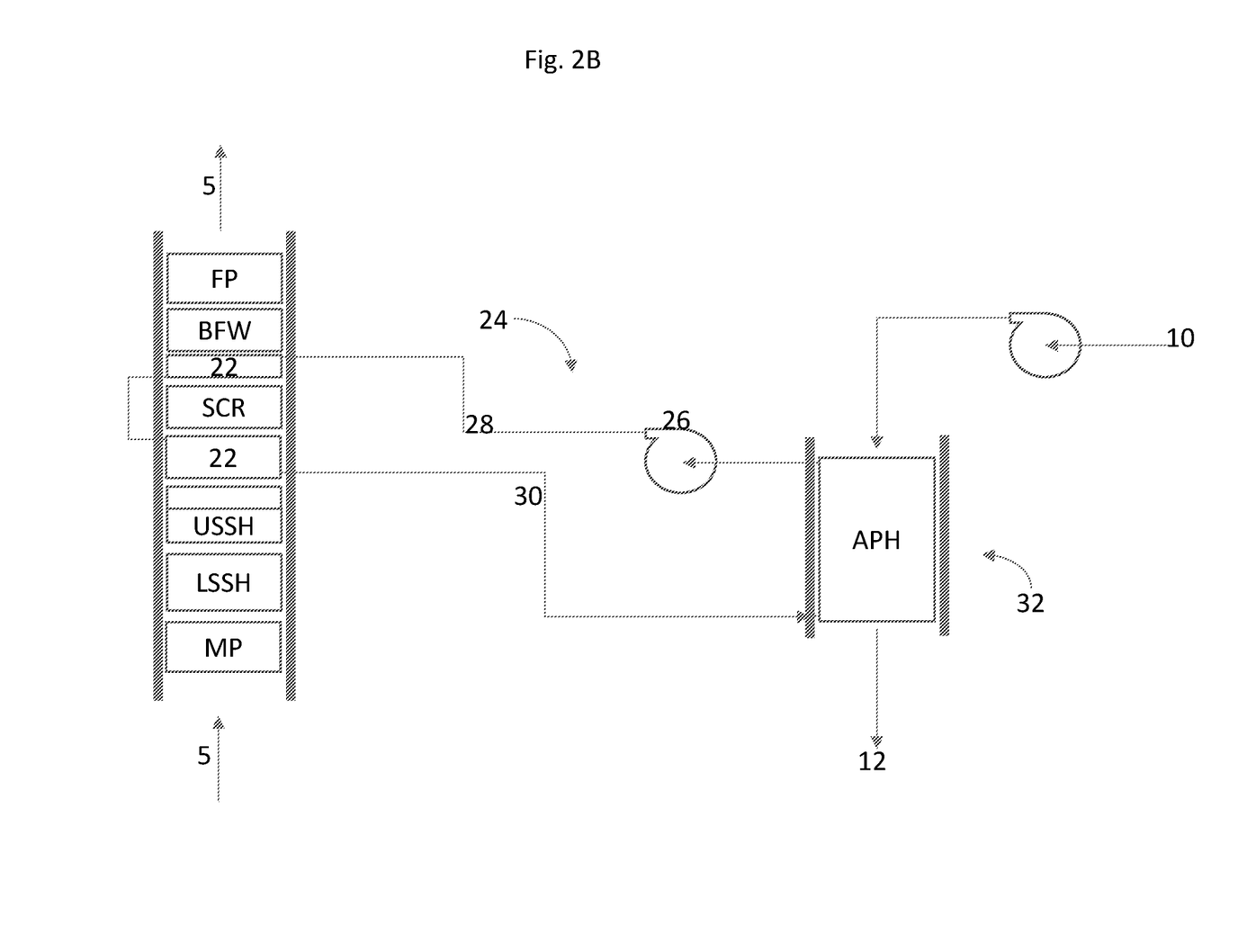

FIG. 2B illustrates one embodiment for recovering heat from a flue gas according to embodiments herein. The coils included within the convective heating section of the furnace are arranged in the following order from lowest (highest flue gas temperature, closest to the combustion box) to highest (lowest flue gas temperature, furthest from the outlet of the combustion box): a mixed preheat coil (MP); a lower steam superheating coil (LSSH); an upper steam superheating coil (USSH); a heat transfer fluid heating coil 22, including a lower heat transfer fluid heating coil and an upper heat transfer fluid heating coil, intermediate of which is a selective catalytic reduction catalyst bed (SCR); a boiler feed water heating coil (BFW); and a feed preheat coil (FP). As described above, heat transfer fluid heating coil 22 receives cool heat transfer fluid from circulation pump 26, heats the heat transfer fluid, and the heated heat transfer fluid circulates via flow line 30 to the air preheat coils APH, which may include one or more finned tubes or other heat transfer surfaces as described above.

In FIG. 2B the heat recovery section is similarly modified to FIG. 2A, however, the BFW coils above and below a catalyst bed for NOx removal are both re-purposed for heating the heat transfer fluid. In this case, the heat transfer fluid is heated in two sections in series.

Figure 2C:
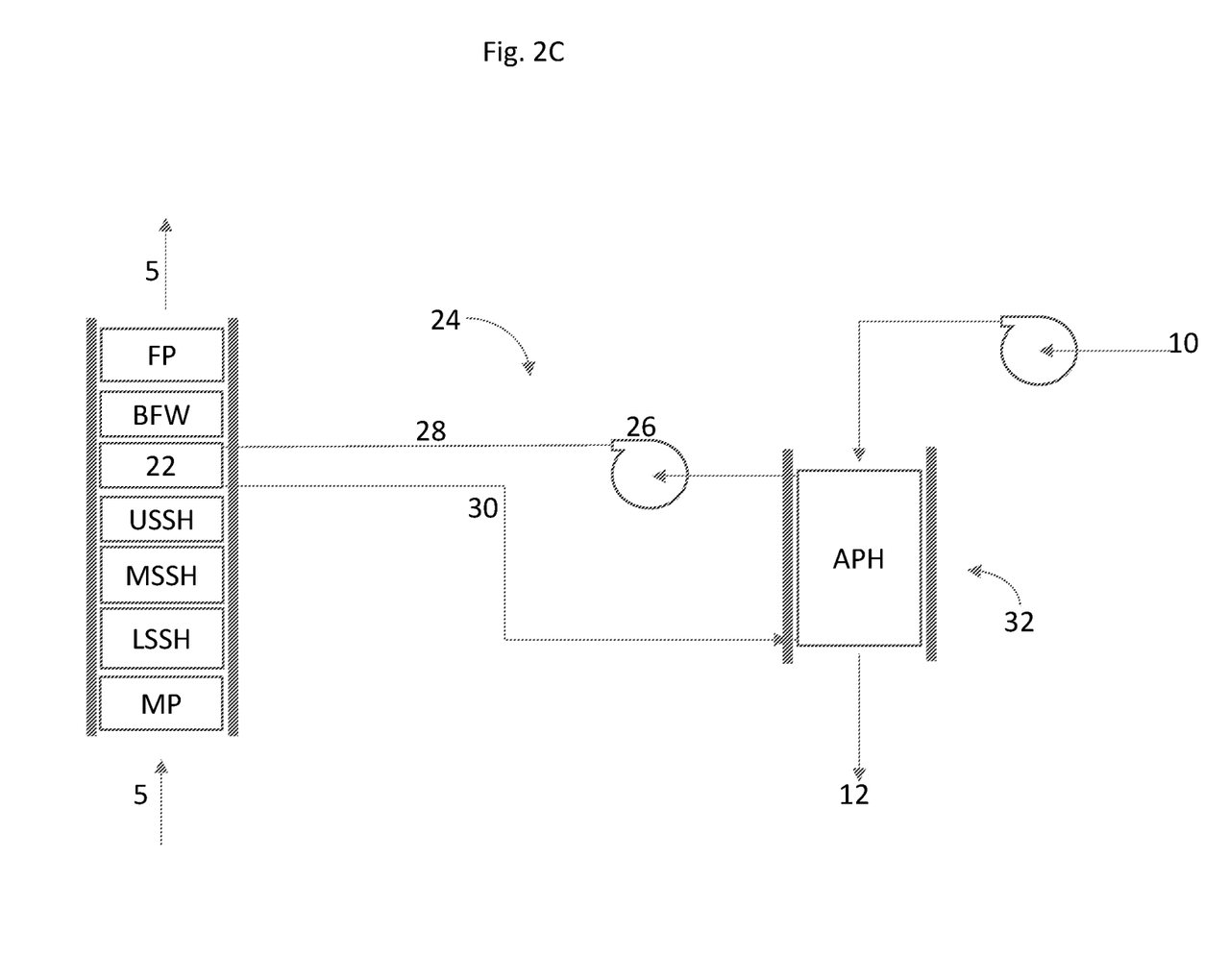

FIG. 2C illustrates one embodiment for recovering heat from a flue gas according to embodiments herein. The coils included within the convective heating section of the furnace are arranged in the following order from lowest (highest flue gas temperature, closest to the combustion box) to highest (lowest flue gas temperature, furthest from the outlet of the combustion box): a mixed preheat coil (MP); a lower steam superheating coil (LSSH); a middle steam superheating coil (MSSH); an upper steam superheating coil (USSH); a heat transfer fluid heating coil 22; a boiler feed water heating coil (BFW); and a feed preheat coil (FP).

FIG. 2C is a similar arrangement as FIG. 2A, except that instead of eliminating some of the tubes in the USSH coils, the fin density is modified to account for the reduced steam generation.

Figure 2D:
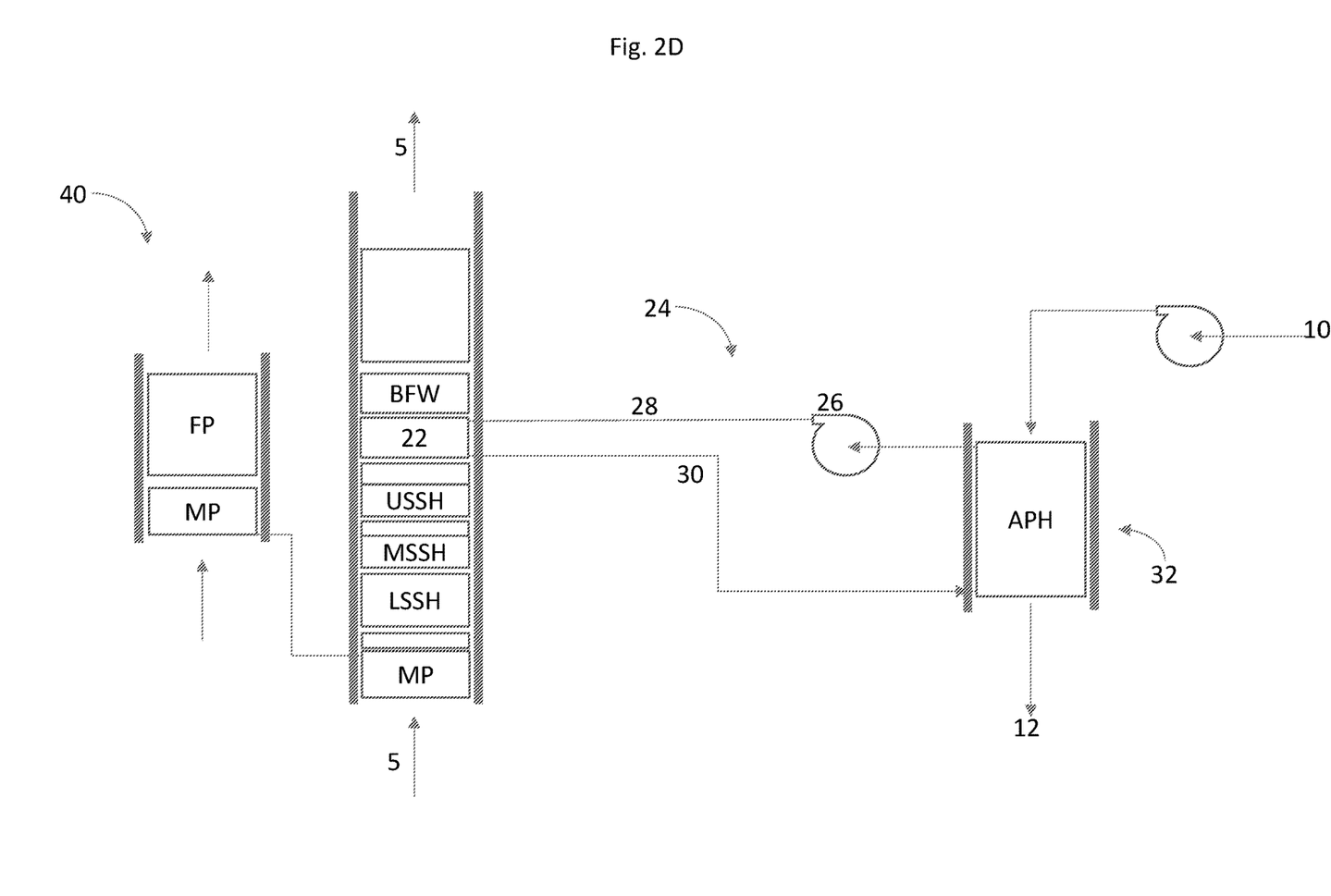

FIG. 2D illustrates one embodiment for recovering heat from a flue gas according to embodiments herein. The coils included within the convective heating section of the furnace are arranged in the following order from lowest (highest flue gas temperature, closest to the combustion box) to highest (lowest flue gas temperature, furthest from the outlet of the combustion box): a mixed feed preheat coil; a lower steam superheating coil; a middle steam superheating coil; an upper steam superheating coil; the heat transfer fluid heating coil; and a boiler feed water heating coil. The furnace system of FIG. 2D further includes a stack 40 connected to a gas turbine exhaust (not illustrated). Stack 40 includes a feed preheat coil (FP) and a second mixed feed preheat coil (SMP), the second mixed feed preheat coil being fluidly connected to the mixed feed preheat coil (MP).

In retrofitting to arrive at the arrangement of FIG. 2D, a feed preheat (FP) coil and a portion of the USSH and LSSH coils are by passed and part of BFW coil is used for the heat transfer fluid heating section. A gas turbine exhaust (GTE) stream is additionally used to preheat feed (FP) and partially preheat mixed feed (MP) which was the duty previously carried out in the convection section. By moving the feed preheat and mixed feed preheat to a new section with GTE heating it allows maximum heat recovery from the GTE and more duty available for the heat transfer fluid recovery section and consequently the air preheat section.

Figure 2E:
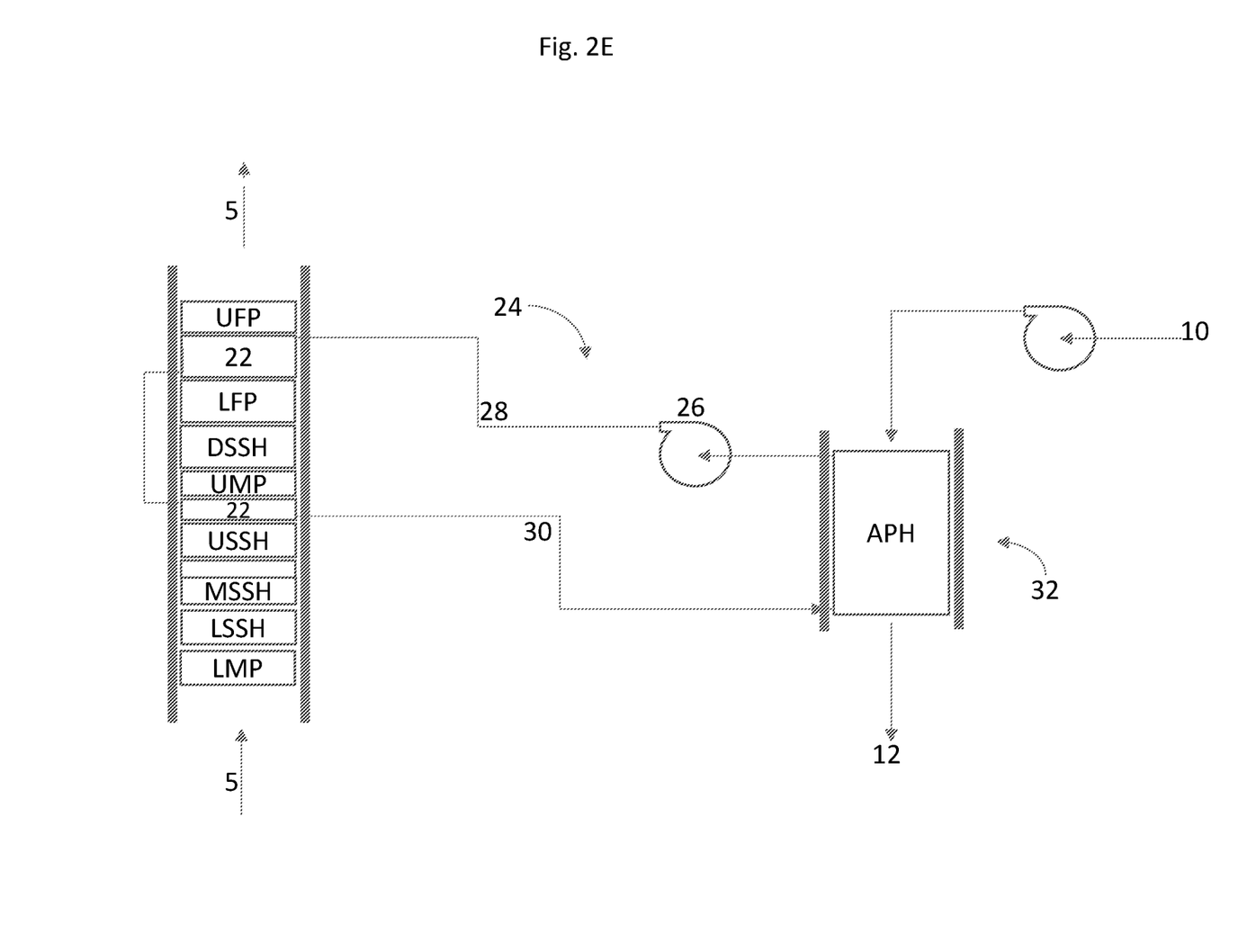

FIG. 2E illustrates another embodiment for recovering heat from a flue gas according to embodiments herein. The coils included within the convective heating section of the furnace are arranged in the following order from lowest (highest flue gas temperature, closest to the combustion box) to highest (lowest flue gas temperature, furthest from the outlet of the combustion box): a lower mixed preheat coil; a lower steam superheating coil; a middle steam superheating coil; an upper steam superheating coil; the heat transfer fluid heating coil, including a lower heat transfer fluid heating coil and an upper heat transfer fluid heating coil, intermediate of which is, from lowest to highest, an upper mixed feed preheat coil, a dilution steam superheating coil, and a lower feed preheat coil; and the feed preheat coil.

In retrofitting to arrive at the embodiment of FIG. 2E, the BFW heating coil is replaced with a heat transfer fluid section. Part of the USSH section is also replaced by a heat transfer fluid heating coil.

For each of the embodiments described above, a thermal calculation was performed based on re-arranging the pre-existing convection layout with a convection section employing a heat transfer fluid according to embodiments herein. The results are summarized in Table 1. Improvements in radiant efficiency ranged from 3 to 10% as compared to arrangements without the heat transfer fluid heating coil and the external heat transfer fluid air preheater. The resulting reductions in CO2 emissions were in the range 8-20%.

TABLE 1

Radiant efficiency and CO2 emissions

| Embodiment | Radiant Efficiency Prior art | Radiant Efficiency Invention | CO2 Emissions reduced by |
|---|---|---|---|
| FIG. 2A | 42.1% | 46.8% | 15.2% |
| FIG. 2B | 41.4% | 47.1% | 20.3% |
| FIG. 2C | 35.3% | 41.0% | 18.7% |
| FIG. 2D | 35.6% | 45.6% | 12.6% |
| FIG. 2E | 41.7% | 44.6% | 8.0% |

While described above with respect to a single furnace and heat transfer fluid circulating system, embodiments herein contemplate fluidly connecting the heat transfer fluid circulation system to multiple furnaces. For example, embodiments herein may include a second furnace having a radiant heating section and a convective heating section, wherein the radiant heating section includes one or more burners configured for combusting a fuel with a pre-heated air stream to produce a flue gas fed to the convective heating section, wherein the second furnace comprises an air pre-heater fluidly coupled to the heat transfer fluid circulation system.

The heating surface in the fired heater can be tubular or any other type of surface form. The heat extraction can be from a heater or any other type of reactor of heat bearing stream.

Embodiments herein can also be used to input heat, instead of extract heat (e.g., warm up flue gas to a service temperature window for downstream heat receiving streams, including SCR application). For example, rather than extracting heat, excess heat available in the heat transfer fluid circulation system, may be used to provide heat to a heat transfer fluid cooling coil disposed upstream of a SCR catalyst bed. The flow rate of heat transfer fluid through the cooling coil may be controlled to result in a desired flue gas temperature at the inlet of the SCR catalyst bed.

In various embodiments, the external air preheat can be combined with heat transfer from other streams that contain heat for warming of the combustion oxidant. For example, a process or utility stream within the plant may be used to pre-heat the combustion air upstream of the air preheater (APH) or further heat the combustion air downstream of the air preheater (APH). Alternatively, excess heat from the heat transfer fluid may be used to heat other streams within the plant, where such additionally provided heat may aid in further reducing CO2 emissions from the overall plant.

A single air preheater per furnace may be used. Alternatively, the heat transfer fluid can be divided into multiple circuits, including embodiments heating combustion air via preheater units directly coupled with each individual burner.

A liquid phase or vapor phase heat transfer fluid may be used.

The heat transfer fluid circulation loop may include other supplementary waste heat sources in addition to heat recovery from the convection section. For example, other sources of waste heat may be used to pre-heat or further heat the heat transfer fluid within the circulation loop.

The prior art arrangements are generally used to warm up the combustion air directly with the combustion flue gas or external waste heat. Further, the heat extraction from the flue gas with the prior art arrangements will require significant ducting work either for the flue gas or the heated air or both, and adds significant load to the structure steel, foundation and/or plot space. Additionally, the heat extraction from waste heat of other sources with the prior art arrangements will not be able to regulate the flue gas temperature in the heater convection section. If the process feedstock is changed or varies then a different heat input may be required for the feed preheat section. The only way to maintain heater thermal efficiency would be to adjust firing rate. By contrast, embodiments herein allow for the thermal fluid temperature or flow rate to be varied, hence the heat transfer in the section which recovers heat from the flue gas can be varied independent of any other plant systems. Hence, embodiments herein apply an intermediate heat transfer fluid to warm up the combustion oxidant that allows compact design and flexibility in various heating schemes.

Embodiments herein will have minimal impact to the heater structure steel, foundation loading and require minimum plot space. By contrast, adding an air preheater to the convection section involves significant structural alterations.

In addition to the advantages identified above, embodiments herein save plot space and cause less congestions to the heater area that may interfere with the heater operation and maintenance.

Embodiments herein also relate to a method of cracking hydrocarbons using the system as described above, such as illustrated in one or more of FIGS. 2A-2E. The method of cracking hydrocarbons may include heating a heat transfer fluid in the heat transfer fluid heating coils to produce the hot heat transfer fluid. The method also includes heating air via indirect heat exchange with the hot heat transfer fluid in the air pre-heater. And, the method includes mixing the pre-heated air with a fuel to form a combustion mixture and combusting the combustion mixture in the one or more burners.

For embodiments including a SCR catalyst bed, embodiments herein may further include controlling a temperature of the flue gas entering the selective catalytic reduction catalyst bed. For example, flow rates of the heat transfer fluid within the heat transfer fluid circulation system may be used to adjust a flue gas temperature at an inlet of the SCR catalyst bed.

Further, embodiments herein may be used to retrofit existing convection section heat recovery systems. For example, when retrofitting a cracking furnace having a steam superheating coil, a boiler feedwater heating coil, and a feed preheat coil, each coil comprising multiple tubes connected to a feed header and an effluent header, the method may include: disconnecting one or more tubes of a boiler feedwater heating coil from a boiler feedwater circulation system; fluidly connecting the one or more tubes to a heat transfer fluid circulation system; and fluidly connecting an air preheater to the heat transfer fluid circulation system and to burners of the furnace. Retrofitting may also include taking one or more tubes of a steam superheating coil out of service, and/or modifying a density of tubes of a steam superheating coil. Retrofitting may allow heat transfer surface optimization or meet the new process design requirement, including material upgrade, extended surface adjustments (fin or stud etc.), tube and fin tip circle diameter changes, process flow direction changes and number of flow streams or parallel passes. Further, as the existing heater may have spare tube rows in the convection section, the spare rows may be used to heat the heat transfer fluid, or the spare rows combined with part of the existing heating surface may form a new coil to heat the heat transfer fluid.

As used herein, coils are referred to (named) based on the materials being processed, and specific coils referred to in the specification and claims herein are defined based on a coil function ("boiler feed water heating" coil, for example). Systems defined by and including such coils necessarily include fluid connections from a feed supply system (e.g., water tank) and to an effluent processing system (e.g., boiler), along with associated tanks, pumps, valves, controls, etc. of the feed supply and effluent processing systems.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent is:

1. A furnace system for cracking hydrocarbons, comprising:
   a furnace having a radiant heating section and a convective heating section, wherein the radiant heating section includes one or more burners configured for combusting a fuel with a pre-heated air stream to produce a flue gas fed to the convective heating section;
   one or more heat transfer fluid heating coils disposed within the convective heating section of the furnace;
   one or more feed preheat coils configured for receiving and pre-heating a hydrocarbon feed to produce a pre-heated hydrocarbon feed;
   a radiant process coil disposed within the radiant heating section, configured for receiving the pre-heated hydrocarbon feed and producing a cracked hydrocarbon product;
   an air preheater having an air inlet, a preheated air outlet, a heat transfer fluid inlet, a heat transfer fluid outlet, and one or more heat exchange surfaces for indirectly heating air received via the air inlet by indirect heat exchange with a hot heat transfer fluid received via the heat transfer fluid inlet to produce the pre-heated air stream, recovered via the preheated air outlet, and a cooled heat transfer fluid, recovered via the heat transfer fluid outlet;
   one or more flow lines fluidly connecting the preheated air outlet with the one or more burners, for supplying the pre-heated air stream to the one or more burners; and
   a heat transfer fluid circulation system including a flow line for circulating the cooled heat transfer fluid from the heat transfer fluid outlet to an inlet of the one or more heat transfer fluid heating coils disposed within the convective heating section of the furnace, and a flow line for circulating the hot heat transfer fluid from an outlet of the one or more heat transfer fluid heating coils to the heat transfer fluid inlet.

2. The system of claim 1, wherein the one or more feed preheat coils is disposed within the convective heating section of the furnace above a location of the one or more heat transfer fluid heating coils.

3. The system of claim 1, comprising a boiler feed water heating coil and one or more steam superheating coils disposed within the convective heating section of the furnace, wherein the one or more heat transfer fluid heating coils is disposed below a location of the boiler feed water heating coil and above a location of the one or more steam superheating coils.

4. The system of claim 3, comprising a selective catalytic reduction catalyst bed disposed within the convective heating section of the furnace, and wherein the one or more heat transfer fluid heating coils comprises an upper heat transfer fluid heating coil and a lower heat transfer fluid heating coil, wherein the selective catalytic reduction catalyst bed is disposed within the convective heating section of the furnace above a location of the lower heat transfer fluid heating coil and below a location of the upper heat transfer fluid heating coil.

5. The system of claim 1, wherein the one or more feed preheat coils comprises an upper feed preheat coil and a lower feed preheat coil, and wherein the one or more heat transfer fluid heating coils comprises an upper heat transfer fluid heating coil and a lower heat transfer fluid heating coil, wherein:
   the upper feed preheat coil is disposed within the convective heating section of the furnace above a location of the lower feed preheat coil;
   the upper heat transfer fluid heating coil is disposed within the convective heating section of the furnace above a location of the lower heat transfer fluid heating coil;
   the upper feed preheat coil is disposed within the convective heating section of the furnace above a location of the upper heat transfer fluid heating coil; and
   the lower feed preheat coil is disposed within the convective heating section of the furnace above a location of the lower heat transfer fluid heating coil.

6. The furnace system of claim 1, comprising coils, arranged in the convective heating section of the furnace in order as follows, from lowest to highest:

a mixed preheat coil;
a lower steam superheating coil;
an upper steam superheating coil;
the one or more heat transfer fluid heating coils;
a boiler feed water heating coil; and
the one or more feed preheat coils.

7. The furnace system of claim 1, comprising coils, arranged in the convective heating section of the furnace in order as follows, from lowest to highest:
a mixed preheat coil;
a lower steam superheating coil;
an upper steam superheating coil;
the one or more heat transfer fluid heating coils including a lower heat transfer fluid heating coil and an upper heat transfer fluid heating coil;
a selective catalytic reduction catalyst bed located between the lower heat transfer fluid heating coil and the upper heat transfer fluid heating coil;
a boiler feed water heating coil; and
the one or more feed preheat coils.

8. The furnace system of claim 1, comprising coils, arranged in the convective heating section of the furnace in order as follows, from lowest to highest:
a mixed preheat coil;
a lower steam superheating coil;
a middle steam superheating coil;
an upper steam superheating coil;
the one or more heat transfer fluid heating coils;
a boiler feed water heating coil; and
the one or more feed preheat coils.

9. The furnace system of claim 1, comprising coils, arranged in the convective heating section of the furnace in order as follows, from lowest to highest:
a lower mixed preheat coil;
a lower steam superheating coil;
a middle steam superheating coil;
an upper steam superheating coil;
the one or more heat transfer fluid heating coils including a lower heat transfer fluid heating coil and an upper heat transfer fluid heating coil;
an upper mixed feed preheat coil, a dilution steam superheating coil, and a lower feed preheat coil located, from lowest to highest, between the lower heat transfer fluid heating coil and the upper heat transfer fluid heating coil; and
the one or more feed preheat coils.

10. The furnace system of claim 1, comprising coils, arranged in the convective heating section of the furnace in order as follows, from lowest to highest:
a mixed feed preheat coil;
a lower steam superheating coil;
a middle steam superheating coil;
an upper steam superheating coil;
the one or more heat transfer fluid heating coils; and
a boiler feed water heating coil.

11. The furnace system of claim 10, comprising a stack connected to a gas turbine exhaust, the stack comprising a feed preheat coil and a second mixed feed preheat coil, the second mixed feed preheat coil being fluidly connected to the mixed feed preheat coil.

12. The furnace system of claim 1, comprising a second furnace having a second radiant heating section and a second convective heating section, wherein the second radiant heating section includes one or more burners configured for combusting a fuel with a pre-heated air stream to produce a flue gas fed to the second convective heating section, wherein the second furnace comprises an air pre-heater fluidly coupled to the heat transfer fluid circulation system.

13. A method of cracking hydrocarbons using the system of claim 1, comprising:
heating a heat transfer fluid in the one or more heat transfer fluid heating coils to produce the hot heat transfer fluid;
heating air via indirect heat exchange with the hot heat transfer fluid in the air preheater to produce a pre-heated air; and
mixing the pre-heated air with a fuel to form a combustion mixture and combusting the combustion mixture in the one or more burners.

14. A method of cracking hydrocarbons using the system of claim 4, comprising:
heating a heat transfer fluid in the one or more heat transfer fluid heating coils to produce the hot heat transfer fluid;
heating air via indirect heat exchange with the hot heat transfer fluid in the air preheater producing a pre-heated air;
mixing the pre-heated air with a fuel to form a combustion mixture and combusting the combustion mixture in the one or more burners; and
controlling a temperature of the flue gas entering the selective catalytic reduction catalyst bed.

15. The method of claim 14, comprising mixing a portion of the flue gas with an air feed to provide a diluted air feed fed as the air heated in the air preheater.

16. A method of retrofitting a cracking furnace having a steam superheating coil, a boiler feedwater heating coil, and a feed preheat coil, each coil comprising multiple tubes connected to a feed header and an effluent header, the method comprising:
disconnecting one or more tubes of the boiler feedwater heating coil from a boiler feedwater circulation system;
fluidly connecting the one or more tubes to a heat transfer fluid circulation system; and
fluidly connecting an air preheater to the heat transfer fluid circulation system and to burners of the cracking furnace.

17. The method of claim 16, comprising taking one or more tubes of the steam superheating coil out of service.

18. The method of claim 16, comprising modifying a fin density of one or more tubes of the steam superheating coil.

19. A heater system, comprising:
a furnace having a radiant heating section and a convective heating section, wherein the radiant heating section includes one or more burners configured for combusting a fuel with a pre-heated air stream;
one or more heat transfer fluid heating coils disposed within the convective heating section of the furnace;
an air preheater having an air inlet, a preheated air outlet, a heat transfer fluid inlet, a heat transfer fluid outlet, and one or more heat exchange surfaces for indirectly heating air received via the air inlet, via indirect heat exchange with a hot heat transfer fluid received via the heat transfer fluid inlet, to produce the pre-heated air stream, recovered via the preheated air outlet, and a cooled heat transfer fluid, recovered via the heat transfer fluid outlet;
one or more flow lines fluidly connecting the preheated air outlet with the one or more burners, for supplying the pre-heated air stream to the one or more burners; and
a heat transfer fluid circulation system including a flow line for circulating the cooled heat transfer fluid from the heat transfer fluid outlet to an inlet of the one or more heat transfer fluid heating coils disposed within the convective heating section of the furnace, and a flow line for circulating the hot heat transfer fluid from an outlet of the one or more heat transfer fluid heating coils to the heat transfer fluid inlet.

20. The heater system of claim 19, wherein the one or more heat transfer fluid heating coils is configured as multiple heating coil sections separated by one or more additional heat recovery coils configured for heating one or more of a hydrocarbon feed, water, steam, or mixtures thereof.

\* \* \* \* \*